(12) United States Patent
Joseph et al.

(10) Patent No.: US 6,176,428 B1
(45) Date of Patent: Jan. 23, 2001

(54) TECHNIQUES FOR READING POSTAL CODE

(75) Inventors: Eugene Joseph, Coram; Duanfeng He, Farmingville, both of NY (US)

(73) Assignee: Symbol Technologies, Inc., Holtsville, NY (US)

(*) Notice: Under 35 U.S.C. 154(b), the term of this patent shall be extended for 0 days.

(21) Appl. No.: 09/287,633

(22) Filed: Apr. 7, 1999

(51) Int. Cl.[7] .................................................... G06K 7/10
(52) U.S. Cl. ................................. 235/462.1; 235/462.02
(58) Field of Search ............................ 235/462.1, 462.02

(56) References Cited

U.S. PATENT DOCUMENTS

| | | |
|---|---|---|
| 5,155,344 | 10/1992 | Fardeau et al. . |
| 5,369,264 | 11/1994 | Rosa et al. . |
| 5,415,479 | 5/1995 | Kuhn et al. . |
| 5,420,403 | 5/1995 | Allum et al. . |
| 5,428,211 | 6/1995 | Zheng et al. . |
| 5,608,200 | 3/1997 | Le Goff et al. . |
| 5,889,269 | 3/1999 | Bridgelall et al. . |
| 6,088,482 * | 7/2000 | He et al. ............................ 382/202 |

* cited by examiner

*Primary Examiner*—Harold I. Pitts

(57) ABSTRACT

The disclosed techniques for reading postal code are adapted for processing data from an optical imager and identifying and decoding various types of postal code found in such data. A baseline is employed.

23 Claims, 9 Drawing Sheets

TECHNIQUES FOR READING POSTAL CODE

FIELD OF THE INVENTION

The invention relates to techniques for reading various types of postal codes using optical code reading devices. Aspects of the invention are particularly useful in imaging optical code readers which are designed to read a wide variety of optical codes in addition to postal code.

BACKGROUND OF THE INVENTION AND OBJECTS

Optical codes are patterns made up of image areas having different light reflective or light emissive properties, which are typically assembled in accordance with a priori rules. The term "bar code" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for checkout services, in manufacturing locations for work flow and inventory control and in transport vehicles for tracking package handling. Optical code readers have been widely adopted in the routing and sorting of mail.

Most conventional optical scanning systems are designed to read one-dimensional bar code symbols. The bar code is a pattern of variable-width rectangular bars separated by fixed or variable width spaces. The bars and spaces have different light reflecting characteristics. One example of a one dimensional bar code is the UPC/EAN code used to identify, for example, product inventory.

The present disclosure relates to techniques especially adapted for reading postal codes. Typically postal codes are characterized by a sequence of bars of uniform width and uniformly spaced along a principal axis of the code. The symbology typically includes a region of regular parallel bars called a clock track. Certain of the bars may extend above and/or below the clock track. These elongated bars are sometimes called ascenders and descenders, and contain coded information.

An example of a postal code is the Postal Numeric Encoding Technique (POSTNET). POSTNET was developed by the U.S. Postal Service to provide an optimized code system for encoding address information on mail. Referring to FIG. 1, the basic elements of the POSTNET code 12 are tall bars or ascenders such as bar 1 and short bars such as bar 2. These bars represent two states, i.e., binary ones and zeros, respectively. Both types of bars are aligned at one edge represented by the line 18 (line 18 is not part of the code symbol). Five bars of code represent one character, for example, one digit of a zip code. The left and right margins of the code are marked by tall bars 3. The postal code called PLANET has a similar structure, but different encoding. In POSTNET code the five bars representing one character include two long and three short bars. In PLANET code the five bars representing one character include three long and two short bars.

Another type of postal code is Canadian Post Office Code. An example of a Canadian Post Office Code is shown in FIG. 1(a). The code is a modified form of the POSTNET code. It is a four-state code with increased alphabetic coding capacity over the POSTNET code described above. The four-states are each exemplified by the ascender bar 4, descender bar 5, full bar 6 (i.e. a bar having both ascending and descending portions) and short, clock bar 7. The clock track lies between lines 8 and 9. (Lines 8 and 9 are not part of the code symbol). Another type of postal code is UK postal code. UK postal code is similar to a two-layer U.S. code with the bottom symbol flipped and the two clock tracks merged. UK code uses 4 bars per character, as compared to 5 bars per character in U.S. POSTNET code. Other four state codes include Australian, Japanese and Belgian Postal Codes.

Postal codes can be read employing imaging devices. For example an image sensor may be employed which has a two dimensional array of cells or photo sensors which correspond to image elements or pixels in a field of view of the device. Such an image sensor may be a two dimensional or area solid state sensor and associated circuits for producing electronic signals corresponding to a two-dimensional array of pixel information for a field of view. An imaging module useable in reading postal codes is disclosed in U.S. patent application Ser. No. 09/096,578, filed Jun. 12, 1998, entitled *IMAGING ENGINE AND METHOD FOR CODE READERS* to Correa et al., which is hereby incorporated by reference. Alternatively, the post processing part of the following algorithm is applicable to systems which use laser scanning imaging, such as the ones disclosed in U.S. patent application Ser. No. 08/275,515 filed Jul. 15, 1994 entitled "*Method And Apparatus For Raster Scanning Of Images*" to Dvorkis et al., which is incorporated herein by reference.

It is an object of the present invention to provide efficient and accurate techniques for reading postal codes.

It is another object of the present invention to provide techniques for reading postal codes employing an optical imaging system.

It is another object of the present invention to provide techniques for employing an optical imager capable of reading various types of one and two dimensional codes and for identifying and reading various types of postal codes.

It is another object of the present invention to provide techniques for reading postal codes of initially unknown type and orientation with respect to the optical code reader.

These and other objects and features of the invention will be apparent from this written description and drawings.

SUMMARY OF THE INVENTION

The present invention relates to techniques for reading postal codes useful in optical code readers, especially imaging optical code readers.

More specifically, there is disclosed methods for identifying and reading various types of postal code contained in image data arrays obtained by an optical code reader. The postal codes are assumed to include a clock track of regularly arranged, parallel bars. The system defines a subimage which contains a characteristic indicative of the presence of postal code. A candidate baseline is located within the subimages which extends across the clock track of the postal code from the left to right of the symbol. If the correct baseline has been chosen, every bar in the symbol will intersect the baseline. Each bar is then tracked above and below the baseline to obtain a string of states based on bar length. The type of code is determined and the string of states is translated to obtain the information contained in the postal code.

In preferred embodiments, the baseline which crosses the clock track from one margin of the postal code to the other is located by selecting a first point on a left margin bar; selecting a second point on a right margin bar and line walking from the first to second point. The selection of end points is verified by testing the uniformity of bar widths and spaces along the baseline to determine whether the baseline is located entirely within the clock track. In a more preferred embodiment a look-up table is used to select said first and second points. Various alternate points, corresponding to new candidate baselines, are selected until the clock track is found.

Preferred embodiments of the present invention employ processing techniques for identifying the type of postal code and applying the appropriate translating algorithm, such as for POSTNET, Canadian Postal Code, PLANET Code or UK Postal Code. In these methods there is first obtained pixel data identified as potentially containing all or a portion of an image of postal code. The entire clock track of the postal code is first located, advantageously in the manner described above. Each bar in the located clock track is examined to determine whether each such bar extends above or below the clock track and to obtain a string of states for the code. The regularity of bars may be tested, and if a gap is identified, a place holder inserted for each missing bar. The type of postal code is determined by examining the number of bars, and the occurrences of ascender and descender bars. An appropriate decoding algorithm is applied for at least one type of postal code and the processing is terminated by a successful decoding. In preferred embodiments, the determination of the type of code includes the steps of determining whether the code has a number of bars indicative of a POSTNET or PLANET code; determining the up/down orientation of the code from the occurrences of ascender and descender bars; and attempting decoding of the string of states as a POSTNET or PLANET code. A determination may also be made of whether the code has a number of bars indicative of a UK postal code and if so, an attempt is made to decode the string of states as a UK postal code. The method may also include steps which attempt to decode the strings of states as a Canadian Post Code, if the attempt to decode the code as a UK postal code fails.

In accordance with the present invention, both two and four state postal codes may be read once bars constituting a clock track have been identified. For each identified bar, further processing determines whether the bar ascends or descends from the clock track. A string of states is thus provided. The system then first attempts to decode the string of states as a two state code if substantially all of the bars extend in one direction or the other from the clock track. For example, if less than 20 or 25% of the bars extending beyond the clock track are identified as descenders (the balance having been identified as ascenders) the decoding algorithm first used is a two state algorithm. If such attempt to decode the string of states as a two state code fails, the processor may then attempt to decode the string of states as a four state code. Such an attempt to decode the string of states as a four state code may first attempt to decode the code as a fixed length four state code. In addition, two and four state decode attempts proceed using less than the theoretical maximum error correction capability of the code.

The present invention also lies in apparatus for reading postal codes. Such an apparatus may include an optical sensor for obtaining a two-dimensional array of image data. Circuitry, including random access memory and a microprocessor, and appropriate software, may be employed to provide the following functions. An autodiscriminator function may be used to identify a cluster of subimages in the image data potentially containing all or a portion of a postal code symbol. A clock track locator function locates a complete clock track in a cluster of subimages by examining bar and space uniformity along one or more baselines extending between code margins. A bar tracker function may be used for determining the length of each bar perpendicular to a baseline, and producing a string of states responsive thereto. An appropriate decoder function translates the string of states to yield the information provided to the user or host system.

In preferred embodiments, the clock track locator includes a memory containing a look up table of a sequence of end points, for generating one or more candidate baselines along which bar and space uniformity is to be evaluated. A line walking algorithm may be used to walk from one end point to a second end point on a candidate baseline. A postal code dispatcher also embodied in hardware and/or software may be used for identifying the type of postal code sensed and decoding the postal code in accordance with a decoding algorithm appropriate for the identified type of postal code.

While the foregoing is provided as a summary of the present disclosure, the invention to be protected is defined by the literal language of the claims and equivalents recognized in law.

DETAILED DESCRIPTION

Figure 1:
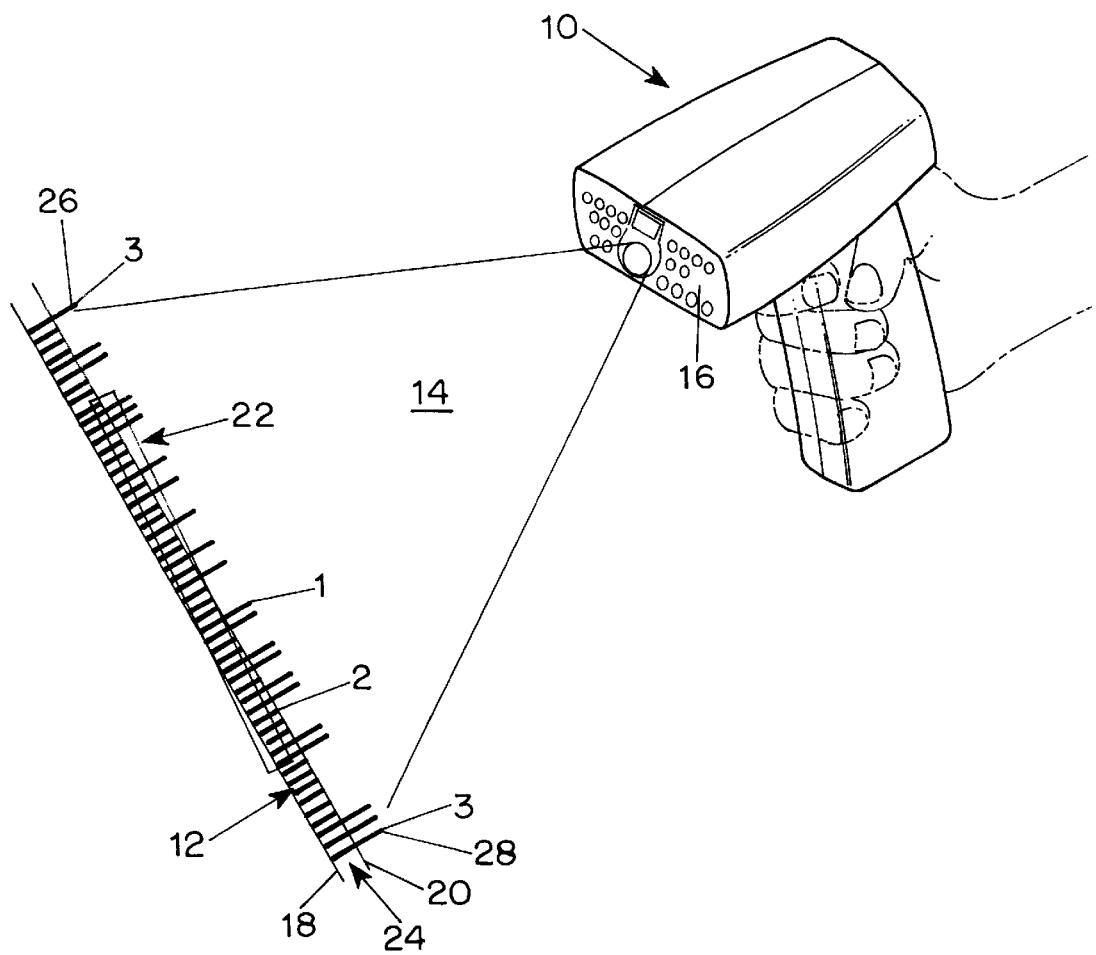
FIG. 1 is a pictorial view of a handheld imaging optical code reader and a POSTNET code symbol.

FIG. 1 is a pictorial view of a handheld, imaging bar code reader 10, shown aimed at a postal code 12. The postal code 12 is shown in the field of view 14 of the reader and oriented at an arbitrary angle with respect to the reader 10. In preferred embodiments the reader includes an imaging engine or module 16 containing an area image sensor such as a CCD. A suitable imaging module is described in the above-mentioned patent application Ser. No. 09/096,578. The image sensor provides pixel array data to circuitry for processing such data and decoding information from various types of optical code.

Figure 1A:
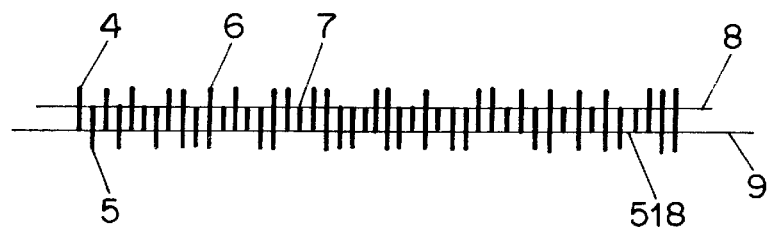
FIG. 1a is an example of a Canadian postal code symbol.

As discussed above, the postal code 12 is characterized by a series of generally parallel bars arranged in a line. Short bars and portions of longer bars define a clock track which is bounded by parallel lines 18 and 20 (which are presented for explanatory purposes and do not form a part of the postal code symbol). Longer bars are variously described as "ascending" or "descending" bars. Various bar lengths may be present in the code depending on code type. For example, four different bar lengths may be present as discussed above in connection with the Canadian postal code example of FIG. 1*a*.

I. Signal Processing and Autodiscrimination of Various Types of Codes

Figure 2:
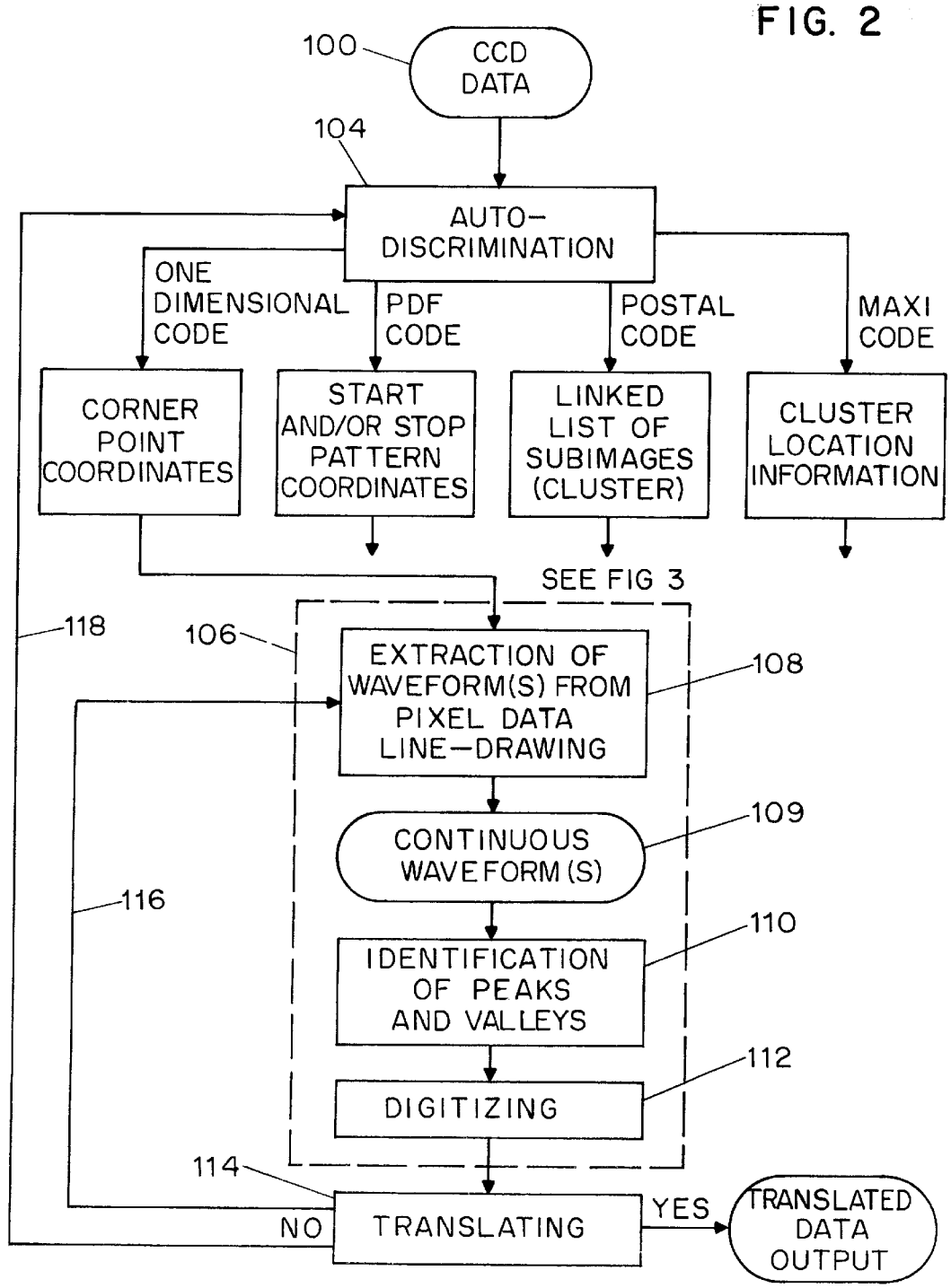
FIG. 2 is a combined flow diagram and system block diagram illustrating autodiscrimination of image code data.

FIG. 2 is a combined flow chart and system block diagram illustrating the processing and decoding of image sensor data in a preferred embodiment of the present invention. Data obtained by the image sensor circuitry is indicated at 100. This data may be in the form of electronic signals corresponding to a two dimensional array of pixel information for a target image. The data may be stored for subsequent processing in a DRAM of the optical code reader. It will be understood that the processing software which implements the processes of to FIGS. 2 and 3 may have access to the stored image data at all levels. At various processing steps, portions of the pixel data may be called up for further processing or to confirm on-going analysis.

The pixel data may be divided into subimages, for example, 32×32 pixel subimages. These subimages are analyzed for properties known to be associated with various types of optical codes and known to distinguish a particular code from other codes and environment (non-code) images. More particularly, a process of statistical Autodiscrimination may be employed. In statistical Autodiscrimination the image is divided into subimages or sections and some statistic computed for each section. Subimages with similar statistics can be grouped to form regions of interest or clusters which may contain codes. The advantage of the statistical approach is that once the statistics are compiled, only the subimages need to be processed, significantly reducing the computation requirements. In addition, the compilation of the statistics is simple and can be done in hardware for super fast systems. The statistic used in preferred embodiments is a histogram of local surface orientations. The statistics can be obtained by analyzing surface tangents in each subimage to cluster the subimages. Once a cluster is identified, the image data may be further analyzed to detect the presence of features associated with particular types of optical codes. One such feature may be the dominant direction of the postal code. Statistical Autodiscimination is a subject of a U.S. patent application Ser. No. 09/096,348 entitled "*AUTODISCRIMINATION AND LINE DRAWING TECHNIQUES FOR CODE READERS*" to He, et al. and assigned to Symbol Technologies, Inc., which application is hereby incorporated by reference. Alternatively, a neural network can be used to discriminate image areas of possible interest as containing optical code. A neural network can also be used to process image data. The location of a projected aiming pattern with respect to the subimages may also be used as an indicia or weighting factor in selecting subimages for further processing.

In preferred embodiments, an Autodiscrimination software executed by the system microprocessor determines which subimage clusters contain codes of a particular type and the coordinates in the pixel data array of certain boundaries or features of preliminarily identified code areas. This system is indicated at 104. As shown in FIG. 2, the image data may be preliminarily designated as a one dimensional code, two dimensional code, Postal Code or MaxiCode, it being understood that other code types with recognizable statistical patterns could be identified at this stage of processing. The remainder of FIG. 2 illustrates a processing scheme for a one dimensional code. Techniques specific to the processing postal codes are illustrated in subsequent Figures.

The Autodiscrimination function 104 provides the coordinates of ends or boundaries of a region of interest designated as potentially containing all or part of a one dimensional barcode. More specifically, the Autodiscrimintion function may provide cluster and orientation information by providing the coordinates of the corner points defining a parallelogram of pixel information identified as containing a one dimensional barcode. Further processing indicated at 106 produces a digitized version of the code. More particularly, the function at 108 extracts one or more waveforms from the data in image areas of interest. This processing involves analysis of pixels near lines selected by the system (line drawing). This process is described in detail in the above-mentioned He, et al. U.S. patent application. The result of this process is a continuous waveform 109 produced from pixel grey scale information in a relatively "wide" line or swath of pixels drawn across the one dimensional code along its principal axis as determined preliminarily by the Autodiscrimination function 104. The width of the line or swath of pixels may be adjustable from one to n pixels. Peaks and valleys in the waveforms are identified as indicated at 110. Digitizing converts this information to electronic signals corresponding to the data or bit content of the image as indicated at 112. Digitizer processing is described in a U.S. patent application entitled *DIGITIZING BAR CODE SYMBOL DATA*" to Duanfeng He and Eugene Joseph, filed on Jun. 12, 1998 and assigned to Symbol Technologies, Inc., which application is hereby incorporated by reference. The digitized output is then translated at 114 to provide a translated data output. The signal line at 116, indicates the possibility of calling for the extraction of data from a different line drawn across the same one dimensional data. A failure to decode any line drawn may be used to trigger additional autodiscrimination in a further attempt to identify and locate a target code as indicated by line 118.

If the autodiscrimination function tentatively identifies the code as PDF code, start and/or stop pattern coordinates are provided and processing continues in the manner described in the above-mentioned Correa, et al. application. If the autodiscrimination function tentatively identifies the code as MaxiCode, subimage cluster location information is provided and processing continues in the manner described in the above-mentioned He, et al. application and in U.S. application Ser. No. 09/176,894 filed Oct. 22, 1998 entitled "*TECHNIQUES FOR READING TWO-DIMENSIONAL CODE INCLUDING MAXICODE*", assigned to Symbol Technologies, Inc., which application is hereby incorporated by reference.

If the autodiscrimination function tentatively identifies the code as postal code, a linked list of subimages, a cluster, are provided and the processing proceeds as now will be discussed.

II. Processing And Decoding Postal Code

Figure 3:
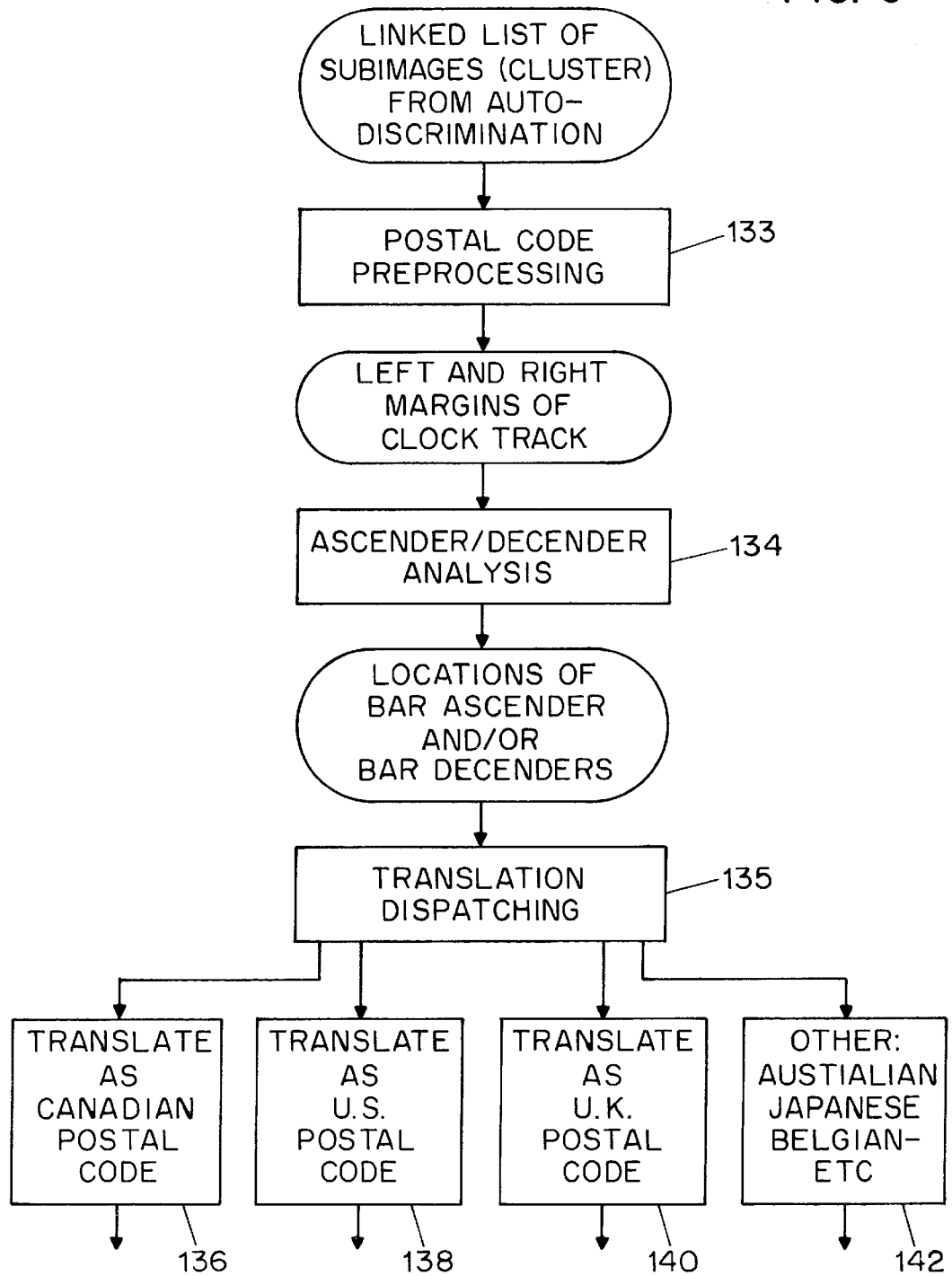
FIG. 3 is a flow chart illustrating the processing and decoding of two dimensional pixel data identified by the autodiscrimination function as postal code.

FIG. 3 is a flow chart illustrating the processing and decoding of two dimensional pixel data identified by the Autodiscrimination function as being Postal Code.

A cluster of Postal Code subimages from the Autodiscrimination function is preprocessed at 133, to find the left and right margins of a Postal Code clock track. The end points of a line crossing the postal code clock track from the first to the last bar are the output of the postal code preprocessor. In preprocessing the code is assumed to be oriented in a subregion constituted by subimages with the strongest correlation or similarity. Left and right subimages are searched to identify a bar in each of the left and right subimages (which are not necessarily the first and last bars of the code). The processing then attempts to identify bar regularity indicative of a clock track between the identified bars. A "try" is defined as a routine which attempts to locate the left and right postal code margins (which may lie beyond the bars just identified). The high aspect ratio of the clock track makes it difficult to find the first and last bars of the clock track on the first try. Therefore, the preprocessing proceeds iteratively until an appropriate baseline has been found and the first and last bars (left and right margins) of the clock track have been identified, by realigning the initial estimate of the clock baseline.

Once the left and right margins of the clock track have been located, the data is further analyzed by a line-walking algorithm at 134 to determine the presence of bar ascenders and/or bar descenders. Based on this information a decoder dispatcher 135 makes tentative determinations as to the type of Postal Code involved. The ascender/descender location data or string of states is passed to an appropriate translation function 136 through 142 and translation is attempted. If translation is unsuccessful, process control may be returned to the decoder dispatcher to select another Postal Code type, or returned to the Autodiscrimination function 104 to select another code type and/or cluster of subimages for analysis.

A. Postal Code Preprocessor

The postal preprocessor looks for a clock track and passes it to the postal decoder. The end points of a line crossing the clock track from the first to the last bar are the output. Details of the preprocessing are described below.

As discussed above, there are a number of preprocessors that comprise the Front End processing. Each of them receives a cluster of subimages as input from the autodiscrimination function. (A cluster is a group of subimages that exhibit similar statistical properties.) In the case of postal codes, the clusters may include extraneous image data such as portions of address information printed immediately above the code.

Figure 4:
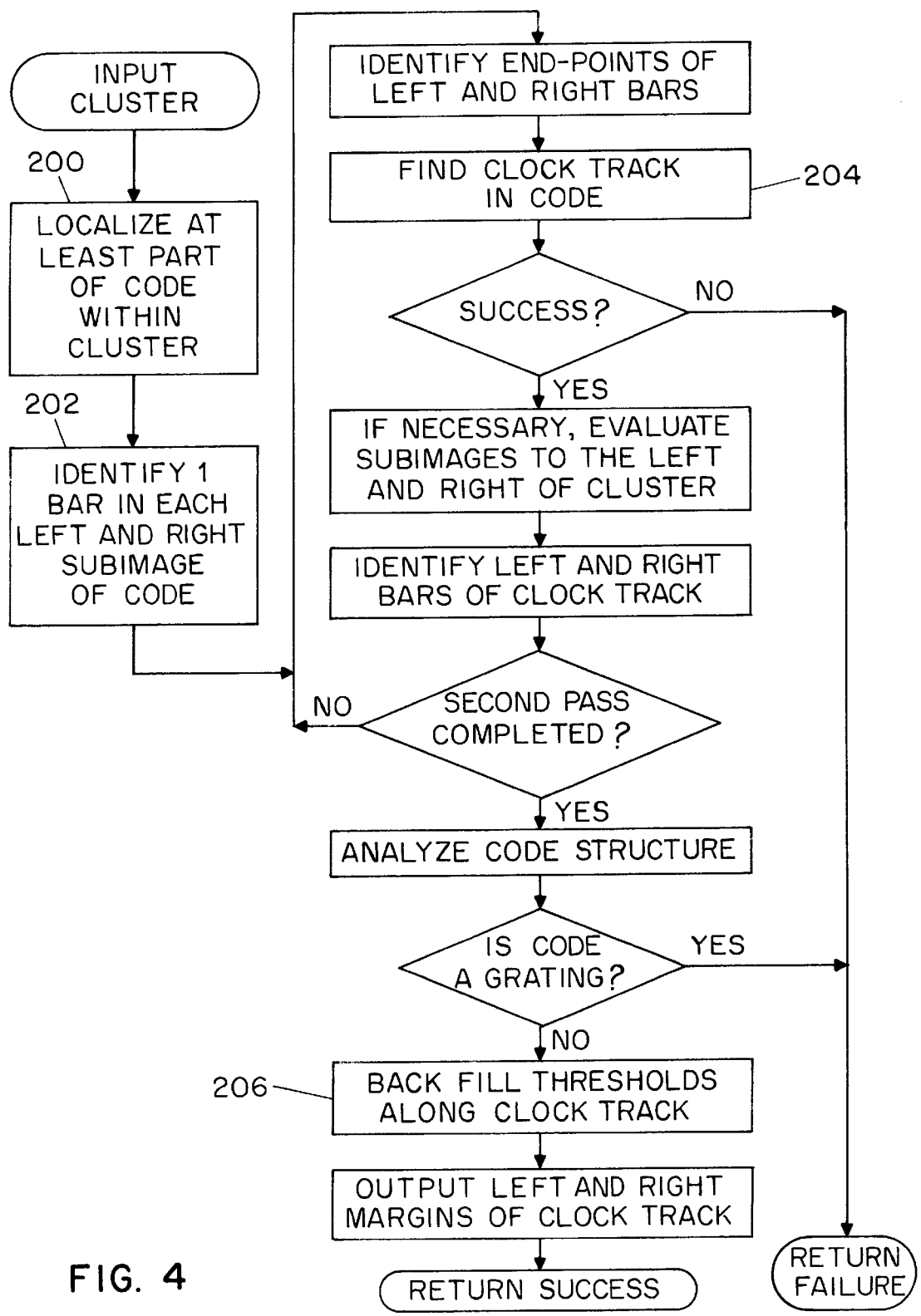
FIG. 4 is a flow chart illustrating a postal code preprocessor.

A flow chart of the postal preprocessor is found in FIG. 4. The first step in the postal preprocessing is to localize the position of at least a part of the code within the cluster as indicated at 200. The code is assumed to include a line of subimages with the strongest correlation or similarity. Next the left and right subimages of the suspect code location is searched at 202 to identify one bar each towards the left and right ends of the code respectively. These need not be the first and last bars of the code. The end points of these two bars (i.e. the upper and lower extremes of the bars in a direction perpendicular to the clock track) provide the input to the routine FindClockTrack at 204. If a clock track has been found, then a margin locator finds the first and last bars of the clock track.

Successful processing gives an approximate location of the clock track. But the high aspect ratio of the clock track makes it difficult to completely determine its location on a first try. This is illustrated in FIG. 1. As shown an estimated or candidate clock track 22, may not align precisely with the actual clock track 24 of the symbol as defined by lines 18 and 20. The alignment may be sufficiently poor that the estimated clock track misses portions of the actual clock track.

A second iteration of finding the end-points of the left and right bars will realign the initial estimate to the positioning of the clock track. If successful, the clock track boundaries represented by lines 18 and 20 may be found. The clock track must be re-evaluated and the first and last bars must be found again by using margin-finding routines. More iterations could be performed to provide a more accurate alignment if desired. In this way, the actual first and last bars 26 and 28 of a sequence of uniformly spaced bars may be found.

It will be understood, however, that completion of these routines does not necessarily identify the image as a postal code, much less identify the type of postal code. For example, a simple grating has uniformly spaced bars but is not a postal code. The sequence must now be analyzed to detect a variation in bar lengths. If this variation exists, a postal code is assumed to be present. A line is drawn across the clock track and is used to compute black/white thresholds for each bar. The end-points of this line represent the location of the clock track and are also saved. The clock track location and thresholds are used by the postal decoder.

1. Find Clock Track

Figure 5:
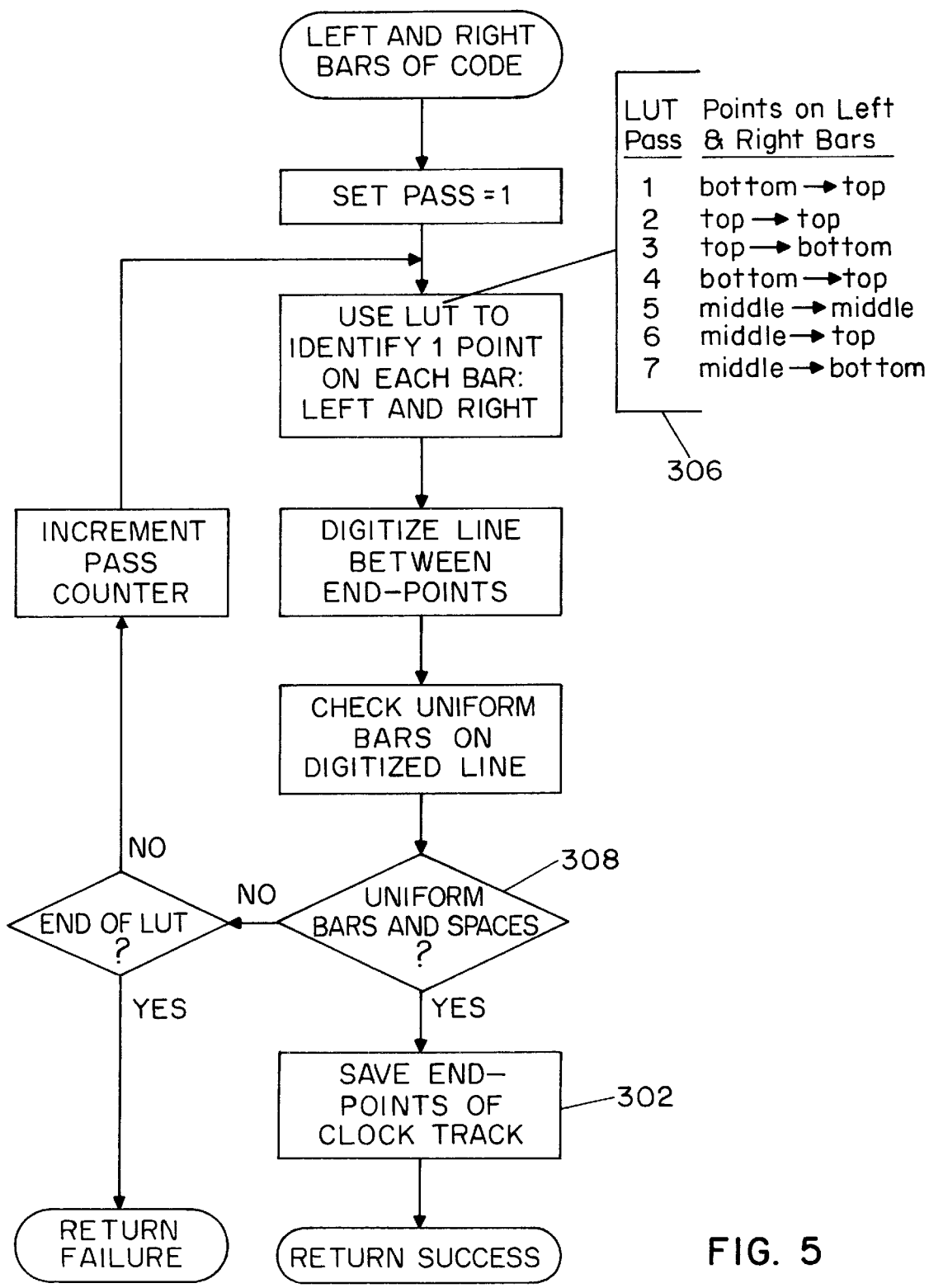
FIG. 5 is a flow chart illustrating a clock track finding subroutine.

The FindClockTrack routine 204 is described in greater detail in connection with FIG. 5. The routine guesses at the state of the left and right bars and checks to see if a clock track is found. As discussed above, the clock track is a sequence of uniform bars and spaces. This uniformity is evaluated and, if the clock track is found, the endpoints of the clock track are saved at 302 and the routine returns success. If the clock track is not found, the guess as to the state of the left and right bars is changed and another attempt is made to identify the clock track. This loop of setting the states of the left and right bars and looking for the clock track can be repeated up to seven times. The state chosen for each iteration is controlled by a LUT (look up table) 304 found in FIG. 5. The clock track is characterized not only by uniform bars and spaces but also by the ratio between the average bar and space widths 308. (space_with<4* bar_width). Uniformity is employed to determine whether a candidate baseline or clock track is a correct one.

2. Check Uniform Bars

Figure 6:
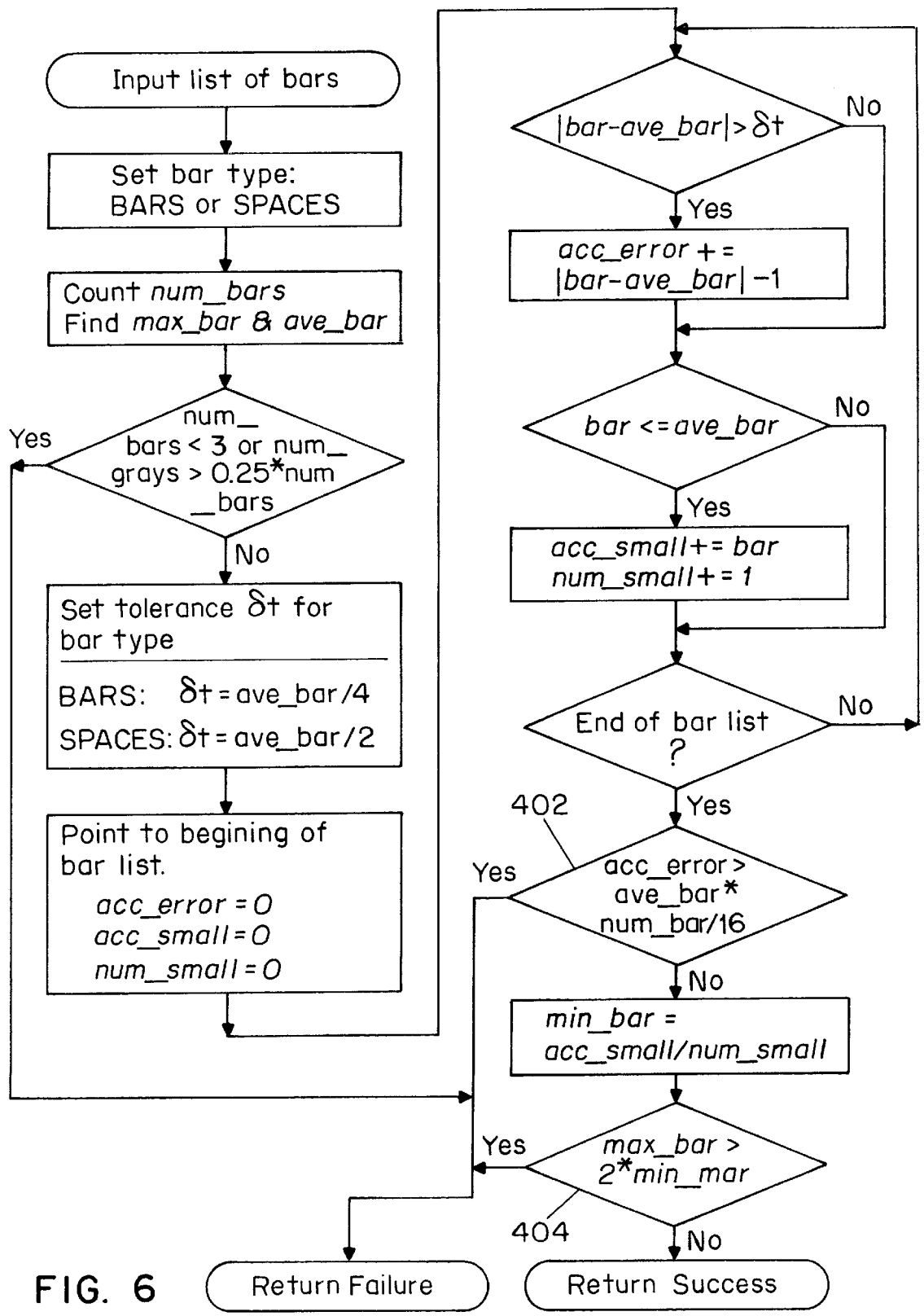
FIG. 6 is a flow chart illustrating a subroutine for checking bar width and spacing uniformity.

FIG. 6 is a detailed flowchart of the routine 308 that checks bar uniformity. A sequence of uniform bars implies that the variance in bar width is small. A variable acc_error accumulates the error between the bar width and the average bar width, if this error is larger than a small threshold δt. If this accumulated error is too large (acc_error>ave_bar*num_bar/(16)) a return failure is indicated at 402. Otherwise if the ratio between the maximum and minimum bars is less than 2, a return success is indicated at 404.

3. Back Fill Thresholds

Figure 7:
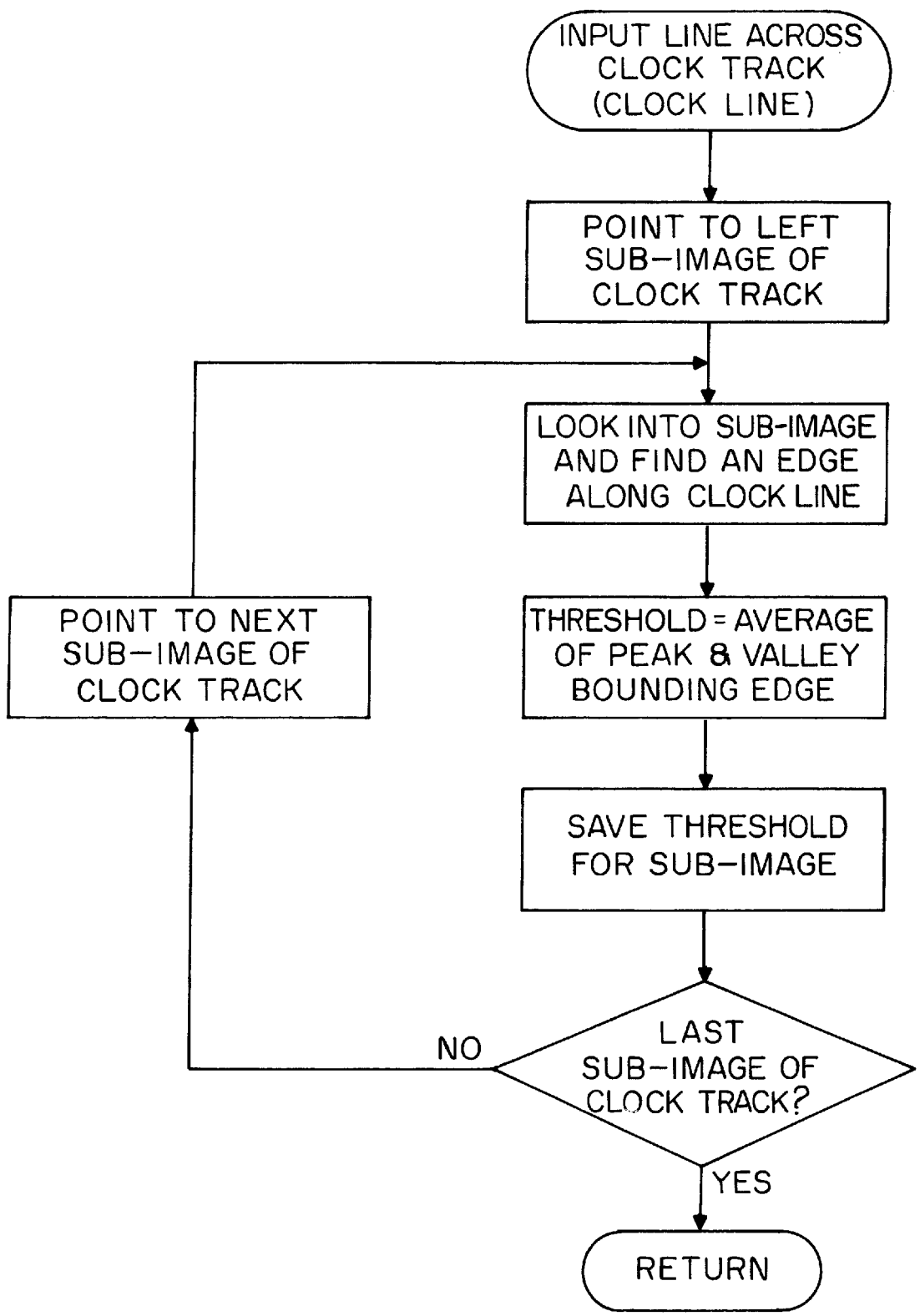
FIG. 7 is a flow chart illustrating a subroutine for back filling thresholds.
Figure 7A:
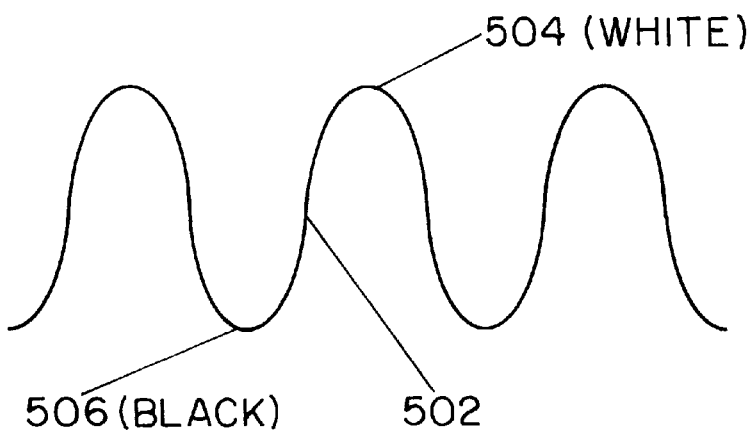
FIG. 7a is a signal waveform used to describe the operation of the subroutine of FIG. 7.

The back fill thresholds routine is indicated at 206 in FIG. 4. This routine accepts as input a line across the clock track. Thresholds are computed by finding edges along this line and taking the average of the peak and valley that bound the edges. FIG. 7a shows the intensity profile along such a line and highlights one edge 502 within is bounding peak 504 and valley 506. A threshold is saved for each subimage along the clock track. The flow chart for this routine is given in FIG. 7.

B. Postal Code Processor

The postal code processor takes the following inputs from the preprocessor: two points which are the end points of a line which cross all bars, and a set of thresholds which can be used to separate bars from background along the line.

The most complicated postal codes proposed or in use today are the 4-state codes. In such codes, bars can be an ascender, a descender, a clock bar or a full bar (see FIG. 1a). The output of the processor is the result of ascender/descender analysis (FIG. 3, block 134). It may be a string of numbers, each representing the state of one bar. A bar's state can be one of the following: a full bar, an ascender, a descender, a clock bar, or a bar with either top or bottom or both having an unclear status (a total of 5 states belong to this category). Obviously the definition of the bars' state accommodates the 4-state postal codes well. The capability of knowing whether a bar is an ascender or descender, instead of only knowing the bar is a "long one", is also important for 2-state (U.S.) postal codes: if the postal code dispatcher downstream finds that the string of states has no ascenders, but only descenders, it can rotate the string by changing all descenders to ascenders and reversing the content of the string. This rotation produces good decodes and avoids possible misdecodes when the postal code is upside-down.

Figure 8:
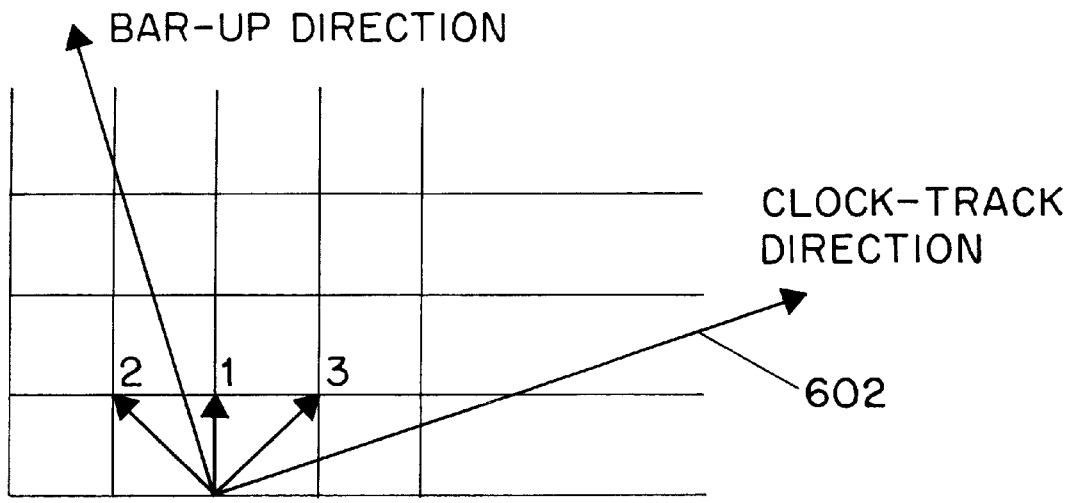
FIG. 8 is a diagram illustrating the finding of cross directions relative to a defined baseline.

The postal code processor may execute the following steps:

1. Referring to FIG. 8, the cross directions for the input or baseline 602 are found and saved for later use. The bar-up direction is found by rotating the input line counter-clockwise by 90°, as shown in the Figure. To allow for noise, the primary direction 1 (one of 8 primary directions on a grid) and its two neighboring directions (2 and 3) are also used as a complete set of directions when doing bar tracking later. The three directions are listed (and later on, searched) according to their closeness to the precise direction (as shown in FIG. 8). The bar-down set of 3 directions is simply the reverse. These directions are useful in the bar-tracking routine.

2. A line-walking algorithm (such as Bresenham's line walking algorithm) is used to walk from one end point of the input line to the other. Various line-drawing algorithms such as, Bresenham's Algorithm, are described in Newman et al., *Principles Of Interactive Computer Graphics*, pp. 20–27 (McGraw Hill, 2d Ed.).

3. During the line walking, the current pixel's gray-level is compared with the local threshold (either received from the preprocessor as input, the calculation of which was mentioned earlier, or a local threshold calculated from the signal variations along the input line). If it does not exceed the threshold, a leading edge of a bar has been found. The walk continues on only if the next pixel is darker than the current one, in order to find the center of the bar across the bar width. A track-bar routine is called from this point to identify the end-points of this bar. The walk continues until a pixel is reached and has a gray-level above the local threshold. This signifies walking off this bar. The processing loops back in search of the next bar, until the destination is reached.

Figure 9:
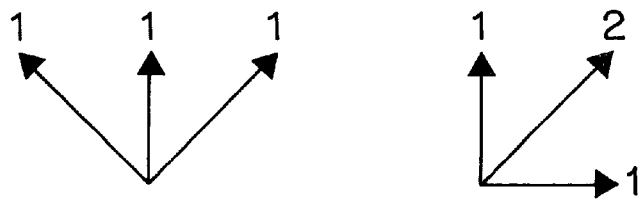
FIG. 9 is a diagram illustrating postal code bar tracking.

4. The track-bar routine starts from the given starting point of each bar found in the previous step, and tracks the bar in both the up and down directions (found in step 1 above). The score for a step in each direction may not be the same, as shown in FIG. 9. If the primary direction is along a grid direction, then every step has the same score. But if the primary direction is a diagonal one, then a side step is only worth half as much as far as the projected distance is concerned. Note only one of these systems is used for a given postal code, not both at the same time. The step size adjustment helps to measure detoured walks around noise voids accurately. With such adjustment, the length of bars in any particular barcode is measured the same way, although the lengths of bars in different bar codes may not be compared because they could be scored differently. The output is how far the bar extends up and down. The location of the bar is recorded in relation to the starting point of the line-walking routine, an essential piece of information for the next step.

5. A segmentation routine makes sure the bars are approximately evenly spaced. If there is a gap, it is filled with an appropriate number of place holders (each place holder corresponding to one missing bar). This is a measure to enhance error tolerance. The decoders downstream can handle correctly a string of states with place holders for unknown bars, but they cannot handle the situation correctly if they are not informed of the missing bars. Similarly, if there is apparently a noise speck that makes the gaps between a bar and the two neighboring bars seem too short compared with other gaps, the noise speck (a false bar) is removed. A noise speck is differentiated from a close, adjacent real bar by the noise speck's typically small height.

6. The average vertical size of the clock track is found in the following fashion. All bar heights and all overlaps between every two neighboring bars are accumulated in a histogram. An "overlap" between two bars is a vertical region wherein both bars lie in parallel such as the overlap circled in FIG. 1a and identified by the numeral 518. Filters are run on the histogram to remove possible noise. Then the smallest peak is taken as the size of the clock bar.

7. An anchor point is found, based on the size of the determined clock track height, to start parsing the bars. The anchor is either a clock bar itself, or is the overlapped portion of two neighboring bars that form the clock track. The anchor is chosen such that it gives a high confidence that the clock track has been correctly identified, by virtue of having the expected size. Using the clock track height from paragraph 6 above, the anchor point gives the top and bottom vertical location of the clock track, in addition to a point to start parsing.

8. The bars are parsed from the anchor point to the left and right. The parsing routines compare the current bar with the previous known bar to assign a state number to the current bar. The clock-track's vertical location is adapted after each bar is parsed, whenever possible. Furthermore, whenever another anchor point is found, the clock-track's vertical location is updated. The parse results in a string of bar states.

C. Translation Dispatch And Decode

Figure 10:
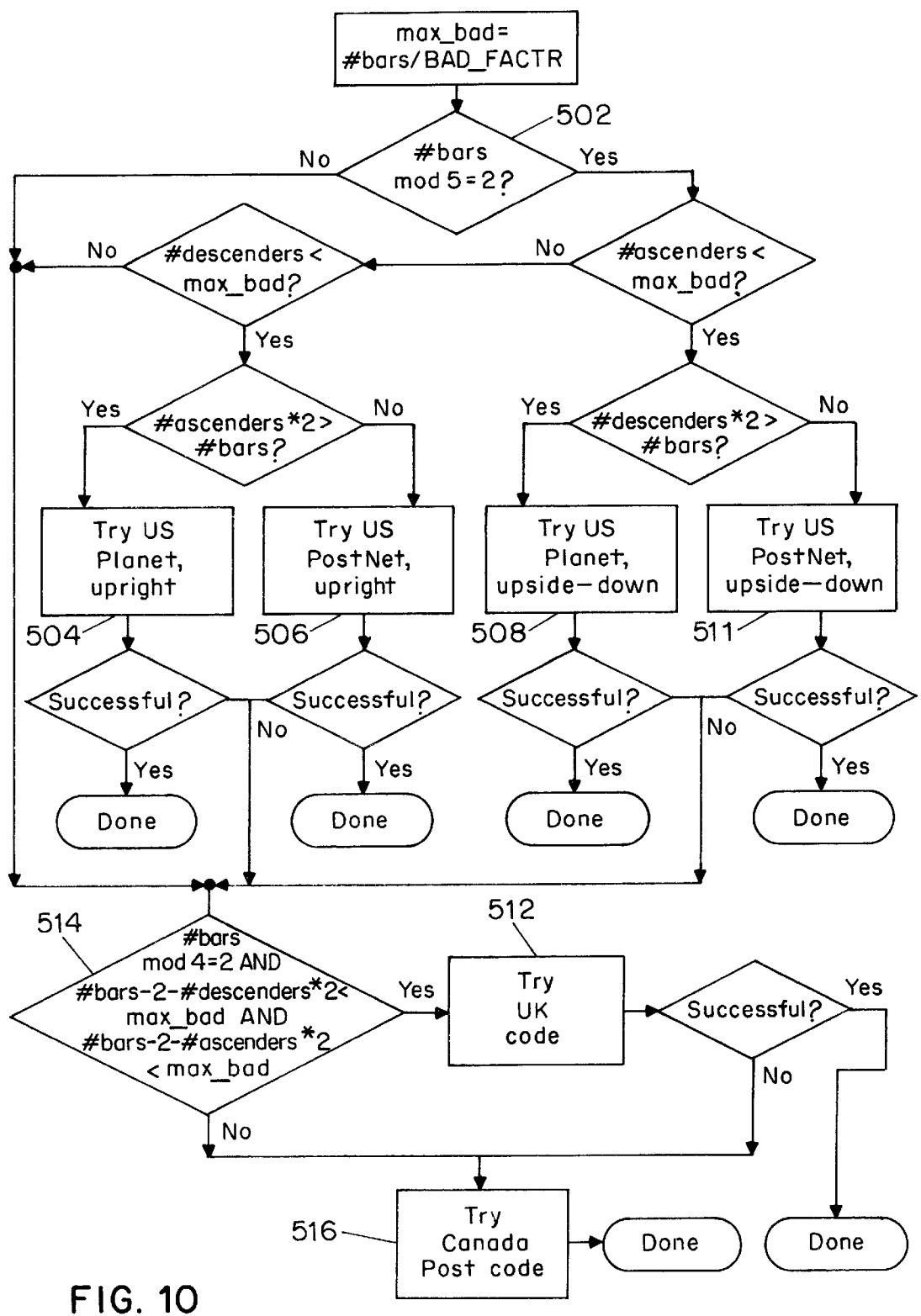
FIG. 10 is a flow chart illustrating a postal code dispatcher with embedded decoders.

As shown in FIG. 3, the string of states is sent to the individual postal-code decoders 136 to 142 by a dispatcher 135. The dispatcher flow chart is shown in FIG. 10. At most three calls are made to decoders for each string of states. For both the U.S. and UK codes, the code has to conform to specific lengths, whereas for Canada Post PostBar there is no such requirement. This is because PostBar has stronger error-correction capability and therefore allows truncated codes to be decoded. For the four-state codes, the individual decoders handle the possibility of rotation. Other postal codes can be accommodated.

The dispatcher 135 may call a revised version of the proprietary Canada Post PostBar decoder (owned by Canada Post), a U.S. postal-code decoder (handles the popular PostNet and the Planet code designed for international mail) and a UK postal-code decoder.

As shown in FIG. 10 an initial modulo division at 502 is used as a preliminary screening between U.S. postal code and UK postal code. If the initial indication is a U.S. code, the system checks on the numbers of ascenders or descenders, and attempts to determine code orientation and to determine whether the code is U.S. Planet or U.S.

PostNet. The appropriate decoding is attempted at 504, 506, 508 or 510. A failure to decode as a U.S. code results in the further evaluation at 514 of the number of ascenders and descenders, which may result in an attempt to decode the string of states as UK Code at 512. Failing the test at 514 results in an attempt to decode the string of states as Canada post code at 516.

Particulars of decoding of U.S. and UK postal code will now be explained.

The U.S. and UK postal codes (not yet in standard use), although apparently very different, are closely related. They both have single bar start and stop patterns, and they both use single-digit checksums. The UK postal code is almost like a two-layer U.S. code, with the bottom one flipped and then the two clock tracks merged. They differ in that the U.S. codes use 5 bars per character while the UK code uses 4 bars per character. Consequently, it is beneficial to have their decoders share the same algorithm, and a large amount of program code.

An object-oriented decoder may be employed for these codes. For the U.S. codes, only one object is used. For the UK code, two objects are used, one for the ascender portion of the code, the other for the descender portion.

The following decoding process may be used:

1. The number of bars is checked against a table or a set of equations. Each code has only a fixed set of allowable number of bars.

2. For U.S. code only: (a) if necessary (with information from previous stage), the string of states is rotated; (b) any descenders are ignored from this stage on.

3. The start and stop patterns are checked. In the case of UK code, the string of input states may need to be rotated if the start and stop patterns indicate the code is upside-down. For the U.S. code, the condition of upside-down is already rectified.

4. One or two decoder objects are created, depending on whether the presence of a U.S. or UK code is indicated. Each decoder takes in a sequence of 1-bit bar states, with 1 representing the existence of an ascender (or descender), and 0 the lack thereof. The sequence is parsed character by character, with 5 bars (bits) per character for the U.S. codes, and 4 for the UK code. While collecting the bits for each characters, the system remembers whether any bar has an uncertain state.

5. Consistency is checked to validate each character. For PostNet and the UK code, each character should have a 2 bit set. For Planet, each character should have 3 bit set. If a character has some bars with uncertain states, the processing determines whether it can be corrected. The logic used to correct the character is this: if all known bars have given the correct number of ascenders, the unknown bars are treated as clock bars; conversely, if all known bars have given the correct number of clock bars, the unknowns are treated as ascenders. If any inconsistency is found, the decode fails.

6. For the U.S. code, the characters are translated into the digits they represent.

7. The checksum is calculated according to the symbology specification (for the UK code, two checksums are calculated, one for the ascenders and the other for the descenders) and compared with the checksum read from the code. If they are not the same, the decode fails.

8. The output message is found for the UK code.

When multiple postal codes are to be read by the system, the system may employ sequential steps to optimize decoding speed and accuracy. In one embodiment, a decision is made to first attempt to decode the code as a two state code based on a determination that substantially all (e.g. more than 75%) of the elongated bars identified are either ascenders or descenders. Various two state codes are tested. If such attempted decoding fails, the string of states is dispatched to a four state decoder. Four state code decoding may then be attempted, the four state decoding attempts being ordered in terms of the allowed variability in the code. For example, a fixed length code decoding would be attempted before, for example, attempting a Canadian Postal Code decoding (the latter symbology allowing for many missing bars). In instances where an error correction feature is present, the system attempts decoding without using the maximum error correction capability. For example, in attempting Canadian Postal or Australian Postal Code decoding, the system will use less than the Reed Soloman code can maximally correct. In U.S., U.K. or Japanese Code, the system will not correct invalid characters through the use of parity values. Instead the system only attempts to correct invalid characters within themselves.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. A method for identifying and reading postal code in image data obtained by an optical code reader, the postal code including a clock track of regular, parallel bars, comprising the steps of:

defining a subregion in the image data which contains a characteristic indicative of the presence of postal code therein;

using image data from the subregion identifying within the image data a baseline which crosses the clock track of the postal code from one margin of the postal code to the other;

locating bars intersecting the baseline;

tracking each bar above and below the baseline to obtain a string of states based on bar length; and decoding the string of states.

2. The method of claim 1, wherein the step of identifying a baseline which crosses the clock track of the postal code from one margin of the postal code to the other includes identifying a first bar in a left subimage of the subregion and a second bar in a right subimage of the subregion;

locating the left postal code margins which may lie in subimages to the left of the first bar; and locating the right postal code margin which may lie in subimages to the right of the second bar.

3. The method of claim 1, wherein the baseline which crosses the clock track from one margin of the postal code to the other is identified by selecting a first point on a candidate left margin bar;

selecting a second point on a candidate right margin bar; and testing the regularity of bars along the baseline to determine whether the baseline is located entirely within the clock track.

4. The method of claim 3, wherein a look-up table is used to select said first and second points.

5. The method of claim 4, wherein different first and second points are selected from the look-up table responsive to a determination that a previous baseline does not lie entirely within the clock track.

6. The method of claim 3, wherein if in testing the regularity of the bars along the baseline, a gap is identified:

inserting a place holder for each missing bar.

7. A method for reading both two and four state postal codes wherein bars constituting a clock track have been identified, comprising the steps of for each identified bar determining whether the bar ascends or descends from the clock track;

obtaining a string of states for the bar code including place holders for missing bars;

selecting a two or four state decoding algorithm appropriate for the type of postal code to be read; and translating the code from the string of states using the selected decoding algorithm.

8. The method of claim 7, wherein U.S. POSTNET code is read.

9. The method of claim 7, wherein Canadian Postal Code is read.

10. The method of claim 7, wherein UK Postal Code is read.

11. A method for reading various types of postal code comprising:

obtaining pixel data identified as potentially containing an image of postal code;

locating an entire clock track of the postal code;

examining each bar in the located clock track to determine whether each such bar extends above or below the clock track and to obtain a string of states for the code;

determining the type of postal code by examining the number of bars, and the occurrences of ascender and descender bars; and applying a decoding algorithm for at least one type of postal code to the string of states.

12. The method of claim 11, wherein the determination of the type of code includes the steps of determining whether the code has a number of bars indicative of a U.S. Postal Code;

determining the up/down orientation of the code from the occurrences of ascender and descender bars; and attempting decoding of the string of states as a U.S. Postal Code.

13. The method of claim 12, further comprising the steps of determining whether the code has a number of bars indicative of a UK code; and attempting decoding of the string of states as a UK code.

14. The method of claim 13, further comprising the steps of attempting decoding of the strings of states as a Canadian Post Code, if the attempt to decode the code as a UK Code fail.

15. The method of claim 11, wherein the clock track is located by (a) identifying candidate leftmost and rightmost bars;

(b) making a series of guesses of the length of the candidate bars to estimate a candidate clock track;

(c) testing the regularity of the bars and spaces in the candidate clock track; and (d) repeating steps (a)–(c) until the entire clock track is found.

16. An apparatus for reading postal codes comprising:

an optical sensor for obtaining a two-dimensional array of image data;

an autodiscriminator for identifying a cluster of subimages in the image data potentially containing postal code;

clock track locator for locating a complete clock track in the array of image data by evaluating candidate baselines beginning with a candidate baseline extending from bars located in subimages within the cluster, by locating the code margins and by examining bar and space uniformity along one or more baselines extending between code margins;

bar tracker for determining the length of each bar perpendicular to a baseline, and producing a string of states responsive thereto; and a postal code decoder for decoding the string of states.

17. The apparatus of claim 16, wherein the clock track locator includes a memory containing a look up table of a sequence of end points, for generating one or more candidate baselines along which bar and space uniformity is to be evaluated.

18. The apparatus of claim 17, wherein a line walking algorithm is used to walk from one end point to a second end point on a candidate baseline.

19. The apparatus of claim 16, including a postal code dispatcher for identifying the type of postal code sensed and decoding the postal code in accordance with a decoding algorithm appropriate for the identified type of postal code.

20. The apparatus of claim 19, wherein the type of postal code is determined by examining the number of clock track bars and occurrences of ascender and descender bars and by attempting to decode the string of states in accordance with a decoding algorithm for at least one type of postal code.

21. A method for reading both two and four state postal codes wherein bars constituting a clock track have been identified, comprising the steps of for each identified bar, determining whether the bar ascends or descends from the clock track to obtain a string of states;

attempting to decode the string of states as a two state code if substantially all of the bars extending beyond the clock track are ascenders or if substantially all of the bars extending beyond the clock track are descenders; and attempting to decode the string of states as a four state code if the attempt to decode the string of states as a two state code fails.

22. The method of claim 21, wherein the attempt to decode the string of states as a four state code first attempts to decode the code as a fixed length four state code.

23. The method of claim 21, wherein the attempts to decode use less than the theoretical maximum error correction capability of the code.

* * * * *